United States Patent
Danko et al.

[15] 3,664,179
[45] May 23, 1972

[54] APPARATUS AND METHOD FOR CONTROLLING A RESONANT TESTING MACHINE

[72] Inventors: Donald M. Danko, Parma; James E. Svarovsky, Cleveland, both of Ohio

[73] Assignee: Gilmore Industries, Inc., Cleveland, Ohio

[22] Filed: May 11, 1970

[21] Appl. No.: 35,996

[52] U.S. Cl. ................................................73/67.2, 73/92
[51] Int. Cl. ..........................................................G01n 29/00
[58] Field of Search..................73/67.2, 90, 91, 92, 95, 67.3, 73/67.4

[56] References Cited

UNITED STATES PATENTS

| | | | |
|---|---|---|---|
| 3,442,120 | 5/1969 | Russenberger et al.............73/67.3 X |
| 2,828,622 | 4/1958 | Gross et al................................73/67.3 |
| 3,187,565 | 6/1965 | Kreiskorte et al. ......................73/67.3 |
| 3,214,969 | 11/1965 | Swanson....................................73/91 |

Primary Examiner—Richard C. Queisser
Assistant Examiner—Arthur E. Korkosz
Attorney—Bosworth, Sessions, Herrstrom and Cain

[57] ABSTRACT

A machine for testing the strength of material specimens by applying a mean and a cyclical load thereto includes a hydraulic actuator connected to the specimen, a servo valve for controlling the flow of hydraulic fluid to and from the actuator and a sensor connected to the specimen. The servo valve is controlled by a train of pulses directed to its actuating coil. The use of pulses as the forcing function allows the system to attain higher operating efficiency. A feedback signal from the sensor is utilized to correct the repetition rate of the pulses to the resonant frequency of the specimen system under test and, after the resonant frequency is attained, to maintain the rate at the resonant frequency. The pulses are area controlled to supply more or less energy to the system as required to maintain the system in resonance at the desired load. A mean load on the specimen is also maintained at a selected value. The machine may be used for standard, non-resonant testing by changing the position of a few switches.

29 Claims, 5 Drawing Figures

INVENTORS
DONALD M. DANKO
JAMES E. SVAROVSKY
BY Bosworth, Sessions
Herrstrom & Cain
ATTORNEYS

APPARATUS AND METHOD FOR CONTROLLING A RESONANT TESTING MACHINE

BACKGROUND OF THE INVENTION

This invention relates to machines for testing the strength of material specimens, and more particularly, to apparatus and method for controlling the operation of such machines.

Structural testing machines are generally hydraulically operated and include a hydraulic power supply, a hydraulic actuator, a servo valve between the supply and the actuator, and control apparatus for the servo valve. In a standard application a specimen is stressed cyclically which causes it to deflect sinusoidally. It is desirable to increase the frequency of the load cycles applied to the specimen in order to decrease the time required for testing. With larger specimen deflections, however, higher frequencies require very large hydraulic power supplies.

The use of the resonant testing mode has helped substantially in this regard. In resonant testing relatively high frequencies can be attained by using the energy stored within a compliant specimen along with added inertial load. The frequency at which the specimen-mass system will oscillate is governed by the following equation:

$$\text{Frequency} = \frac{1}{2\pi} \sqrt{\frac{K}{M}}$$

Where:
Frequency is in Hertz
$K$ = Specimen Spring Constant in LBF/In.
$M$ = Added Mass in LB-SEC$^2$/In.

In the resonant mode the amount of energy required to be introduced to the system need only be sufficient to overcome the losses therein. The system $Q$ is measure of the efficiency of the system and is defined as the total energy in the system divided by the energy introduced thereto. In resonant testing systems employing a sinusoidal forcing function the equation for $Q$ is as follows:

$$Q = \sqrt{\frac{KM}{D}}$$

$Q$ = The performance figure of merit
$K$ = Specimen spring constant in LBF/IN
$M$ = Total mass in LB SEC$^2$/IN
$D$ = Damping coefficient in LBF-SEC/IN Prior resonant testing machines have generally utilized the principal of "mass magnification" to excite the system into the resonant mode of operation. Systems employing this principal generally include a second hydraulic actuator, called an exciter, which adds the necessary force to the main actuator to achieve resonant drive. Hydraulic fluid is introduced to and taken from the exciter through a servo valve having its opening varied sinusoidally to produce a sinusoidal variation in the flow of hydraulic fluid to the exciter and therefore, in the energy supplied from the exciter to the main actuator.

High efficiencies have not been attained with this technique for several reasons. One reason is the exciter which is an added element in the system and requires energy otherwise useable in loading the specimen. Another reason is that the main actuator has too much damping due to static and coulomb friction which lowers the system $Q$. More importantly, the sinusoidal variation of flow in the exciter is relatively inefficient as will be discussed more fully below.

SUMMARY OF THE INVENTION

A general object of this invention is to provide an improved resonant testing machine that overcomes the deficiencies noted above in prior resonant testing machines.

Another object is to provide a method and apparatus for controlling a resonant testing machine that allows higher efficiency to be attained.

Still another object is to provide apparatus for controlling a resonant testing machine that automatically excites the specimen-mass system to its resonant frequency and maintains the system at resonance as the characteristics of the specimen change during test.

Another object is to provide improved apparatus for controlling and maintaining a mean load applied to the specimen-mass system.

Yet another object is to provide control apparatus for a resonant testing machine that can be used with a standard testing machine by merely repositioning a few switches.

The control method according to this invention, for use in a machine having a hydraulically actuator connected to a specimen under test, a mass associated with the specimen of such magnitude that the specimen-mass system has a resonant frequency within a desired range and a servo valve for controlling flow of hydraulic fluid under pressure to and from the actuator, comprises supplying periodic control pulses to open the valve to an extent determined by the pulse height and for a time determined by the pulse width, the repetition rate of the pulses corresponding to the resonant frequency of the specimen-mass system.

In accordance with an aspect of this invention apparatus is provided to control the operation of a resonant testing machine including means for supplying periodic control pulses to open the servo valve, means for controlling the repetition rate of the pulses to cause the rate to correspond to the resonant frequency of the specimen system under test, and means for controlling the area of the pulses to control the amount of energy supplied to the specimen-mass system.

The use of pulses as the forcing function in the system produces higher values of system $Q$ or efficiency than attained in prior systems using a sinusoidal signal as the forcing function.

Other aspects of the invention include the provision of a novel automatic frequency control circuit for causing the repetition rate of the pulses to correspond to the resonant frequency of the specimen-mass system, an automatic gain control circuit for controlling the amount of energy supplied to the specimen-mass system and a circuit for maintaining a predetermined mean load on the specimen.

DESCRIPTION OF THE PREFERRED EMBODIMENTS

Figure 1:
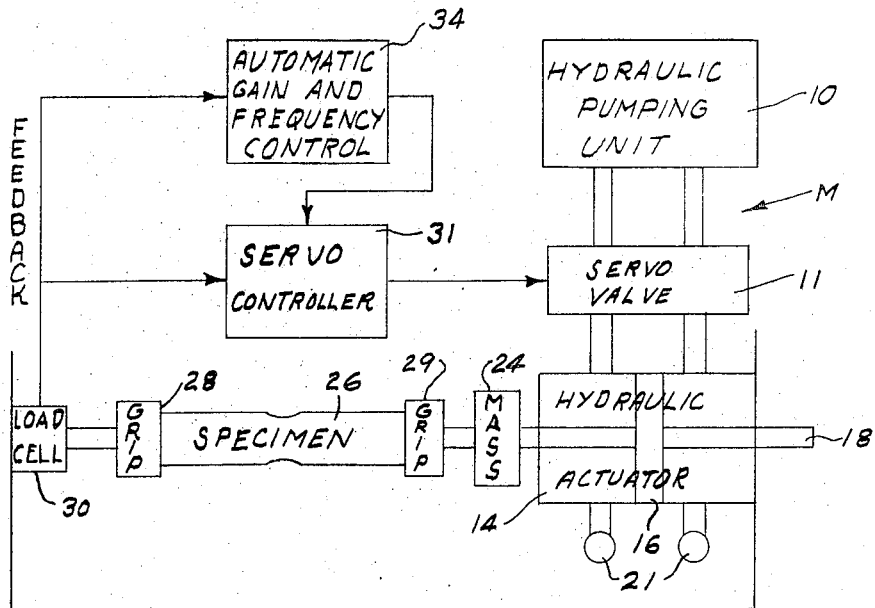
FIG. 1 is a block diagram of a resonant testing machine employing the control method and apparatus according to this invention.

In FIG. 1 a structural testing machine generally designated M is supported on a frame F that is suitably equipped to prevent transmission of vibrations to the floor of a room in which the machine is located. Machine M includes a hydraulic pumping unit 10 which supplies hydraulic fluid through a controlled servo valve 11 to a hydraulic actuator 14. The hydraulic actuator is in the form of a cylinder and has an internal piston 16 with a rod 18 connected thereto. Rod 18 is slidable through seals (not shown) at each end of the actuator. A pair of hydraulic accumulators 21 are open to the interior of the cylindrical actuator and operate in a known manner to assist the actuator 14 where higher deflections of a specimen under test are required.

Rod 18 extends through the left, as shown, end of the hydraulic actuator and is drivingly connected to a mass 24. The mass 24 may be of any suitable form, such as one or more steel plates. The specimen 26 to be tested is connected between specimen grips 28 and 29, through grip 29 to mass 24 and through grip 28 to a sensor such as a load cell 30 which senses the resulting force on the specimen 26 as it is being tested. Load cell 30 may, of course, be positioned other than as shown, as for example, between grip 29 and mass 24.

A servo controller 31 controls the actuation of servo valve 11 to allow hydraulic fluid to be supplied to one side or the other of piston 16 in hydraulic actuator 14. An automatic gain and frequency control unit 34 supplies to servo controller 31 a portion of the signal supplied to servo valve 11. A feedback signal from load cell 30 is supplied to serve controller 31 and to automatic gain and frequency control unit 34 to modify the output signals of those units in accordance with the force on specimen 26 sensed by load cell 30.

In operation, servo valve 11 is actuated by a signal from servo controller 31 to allow hydraulic fluid to pass into hydraulic actuator 14 on one side and then the other of piston 16 to drive the piston in one direction and then the other. The pressure supplied by the hydraulic fluid is transmitted through rod 18 to mass 24 and specimen 26. The sinusoidally varying force through the specimen 26 is sensed by load cell 30 and fed back to servo controller 31 and automatic gain and frequency control 34 to modify the signal supplied to servo valve 11.

The same general operation described above applies for both standard and resonant testing, although in standard testing the mass 24 is generally not used and automatic gain and frequency control unit 34 functions only as a command signal generator as will be discussed more fully below.

As discussed above, resonant testing employs the elastic properties of the specimen to minimize the amount of energy required to stress the specimen a sufficient amount at a relatively high rate. Sufficient mass, such as mass 24, is added to the system to bring the resonant frequency of the specimen-mass system to approximately the desired value. The specimen may also have a mean load applied thereto, either tension or compression, so that the load on the specimen varies cyclically about a mean valve. As discussed above, the only energy that must be supplied to the resonant specimen-mass system is the amount required to overcome the losses due to friction and damping in the system.

In the operation of the structural testing machine according to this invention, sufficient mass 24 is added to the system to bring the resonant frequency of the specimen-mass system to approximately the desired frequency of operation. The automatic gain and frequency control unit 34 provides a signal to servo controller 31 and automatically changes the frequency of the signal until it determines the resonant frequency of the specimen-mass system. The desired mean load is set in servo controller 31. The mean load signal and the varying signal are combined in servo controller 31 to produce a signal that positions servo valve 11 to cause the selected mean load to be applied to the specimen-mass system. The combined signal also operates the servo valve about that position to supply enough energy in the proper phase relationship to the hydraulic actuator to overcome friction and damping losses in the system.

The periodically varying signal supplied to operate the servo valve is in the form of a pulse train having a particular amplitude and duty cycle. The amplitude of the pulses determines the degree of opening of the servo valve while the width of the pulse determines the time it remains open. The servo valve 11 is a high response electrodynamic servo valve such as the MB Electronics Model HV 50 which is capable of responding faithfully to the pulse train supplied to its actuating coil.

Use of the pulse train rather than a sinusoidally varying signal along with a high response servo valve allows the system to achieve higher operating efficiencies or higher values of $Q$.

The basic definition of $Q$ is given at page 275 of Dynamics Systems Analysis by Samuel Seely (published by Reinhold Publishing Corporation) as $2\pi$ times the peak stored energy divided by the energy dissipated in one cycle. It has been noted in Advanced Mathematics in Physics and Engineering by Arthur Bronwell (published by McGraw-Hill Book Company, Inc.) at page 135 that the response of a system may be greatly affected by the phase of the forcing function at the instant it is applied. Bronwell gives an example showing that a sine forcing function will yield a higher $Q$ than a cosine forcing function for identical amplitudes.

It can be shown mathematically, employing pole-zero plots, that for a force-velocity system a sine forcing function does yield higher system $Q$ than a cosine forcing function of the same amplitude, and, more importantly, that a periodic pulse forcing function yields still higher system $Q$.

From another viewpoint, considering the electrical analog of the system in FIG. 1 herein, the opening of the servo valve appears as a variable impedance damping the resonant circuit. It is apparent that the average opening of the valve is smaller, and the average impedance higher, when driven sinusoidally than when driven full open by periodic pulses. The valve when pulse driven, then, provides less impedance in the system and allows higher system $Q$ to be attained.

In prior systems employing sinusoidal forcing functions system $Q$ has been on the order of 10. In systems employing periodic pulses in accordance with our invention system $Q$'s attained have been 40 to 50.

Referring again to FIG. 1, the mean load and the pulses are directly supplied in hydraulic form to hydraulic actuator 14 which transmits the mean and cyclic forces to the specimen-mass system causing the specimen 26 to be loaded about the mean load value at or near the resonant frequency of the specimen-mass system. Because of the inertia of the specimen-mass system the pulse train is effectively filtered so that the force on specimen 26 varies sinusoidally with a frequency equal to the repetition rate of the pulse train. The feedback signal from the load cell 30 is thus a sinusoidal signal superimposed upon a DC signal representing the mean load on the specimen. The amplitude of the feedback signal represents the amplitude of the force on specimen 26.

The DC portion of the feedback signal is sent directly to servo controller 31 and compared to the signal representing the desired mean load on the specimen so that the signal representing the mean load can be corrected to achieve and maintain the desired mean load on the specimen. The AC portion of the feedback signal is sent to the automatic gain and frequency control unit 34 where its phase is compared with that of the input signal to determine if the specimen-mass system is actually operating at its resonant frequency.

If the specimen-mass system is not operating at its resonant frequency the frequency of the input signal is corrected until a comparison of the phase of the feedback signal with that of the input signal indicates that the specimen-mass system is operating at its resonant frequency. Also, as the test proceeds the elastic properties of the specimen may change resulting in a change in the resonant frequency of the specimen-mass system. When that happens the automatic gain and frequency control unit will cause a change to be made in the frequency of the input signal to servo valve 11 so that the specimen-mass system is always operating at its resonant frequency even as its resonant frequency changes during the test.

The amplitude of the feedback signal from load cell 30 is also compared in the automatic gain and frequency control unit 34 to the input signal to ensure that sufficient energy is supplied to the specimen-mass system to compensate for damping and friction losses. If the amplitude of the feedback signal falls below a predetermined value the duty cycle of the input pulse train is increased to increase the duty cycle of servo valve 11 and increase the input energy to the system, while if the amplitude rises above a predetermined value the duty cycle of the input pulse train is reduced to provide less input energy to the system.

The structural testing machine according to this invention may also be employed for standard, non-resonant testing by employing the automatic gain and frequency control unit 34 only as an input command generator producing a constant frequency sinusoidal command so that specimen 26 is stressed at any desired non-resonant frequency. For non-resonant testing the mass 24 is also usually removed from the system. Detailed operation of servo controller 31 and automatic gain and frequency control unit 34 is described below.

Figure 2:
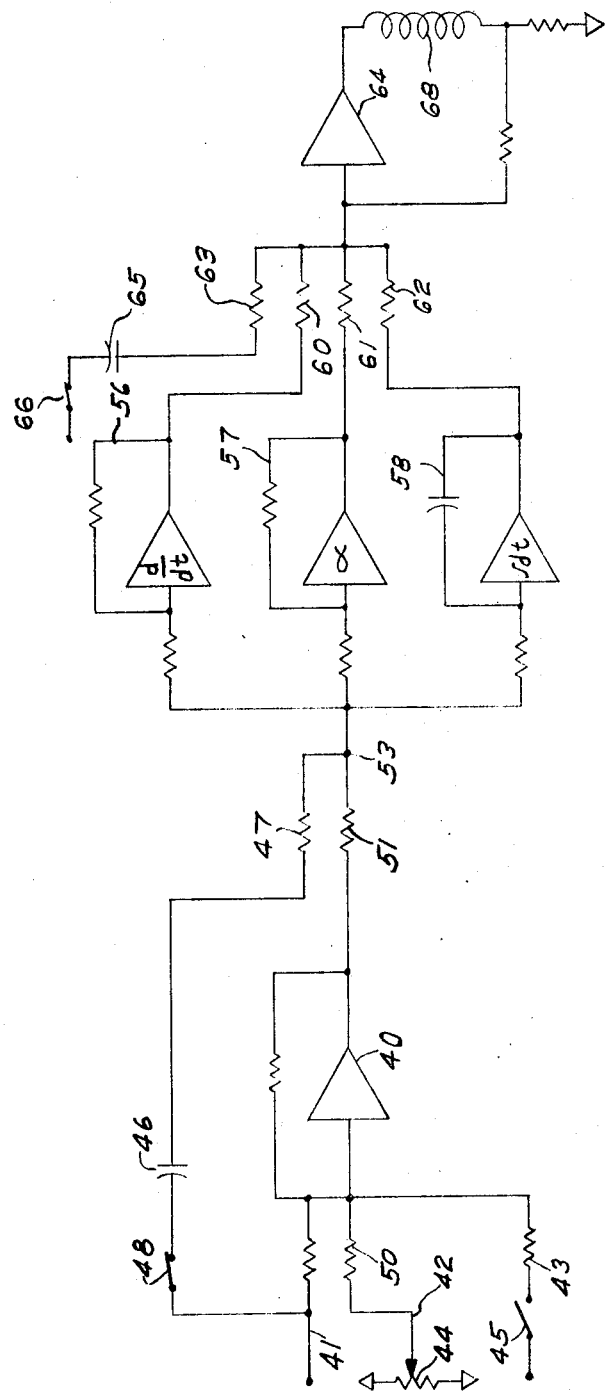
FIG. 2 is a schematic diagram of the servo controller shown in block form in FIG. 1.

FIG. 2 is a detailed schematic diagram of servo controller 31. The servo controller includes a summing amplifier 40 having inputs 41, 42 and 43. Input 41 is connected to the feedback signal from load cell 30 (FIG. 1). Input 42 is connected to the wiper of a potentiometer 44 by which a DC signal is selected corresponding to the desired mean load on specimen 26. Input 43 is connected through a switch 45 to receive a command signal from automatic gain and frequency control unit 34 only during non-resonant testing operation as will be described below.

The feedback signal from load cell 30 includes a DC component proportional to the mean load on specimen 26 and an AC component corresponding to the time varying load on specimen 26. In summing amplifier 40 it is desired only to compare the DC component representing the actual mean load on specimen 26 to the selected mean load so that the mean load may be maintained at the proper amount for the particular test. The AC component of the feedback signal must therefore be cancelled. This is accomplished by capacitor 46 and resistor 47 connected through switch 48 around the summing amplifier. Switch 48 is open during non-resonant testing operation as will be described below.

The feedback signal at input 41 and the mean load set point signal at input 42 are summed in resistors 49, 50 respectively, are inverted by amplifier 40 and appear across resistor 51 at the output of amplifier 40. Only the AC component of the feedback signal has passed through capacitor 46 to appear across resistor 47, while both the AC and DC components are inverted in amplifier 40 and appear across resistor 51. The AC component of the feedback signal is therefore nulled at summing point 53 so that the net signal at point 53 is a DC signal representing the correction to be applied to the mean load on specimen 26 to bring it to the desired value.

This corrective signal is entered into operational amplifiers 56, 57 and 58 which respond, respectively to provide derivative, proportional and integral, or reset, response to the corrective signal. The outputs of the amplifiers are summed in resistors 60, 61 and 62 with the pulse train from automatic gain and frequency control unit 34 in resistor 63. The combined signals are converted to a current signal and amplified by amplifier 64. Any DC component in the pulse train from automatic gain and frequency control unit 34 is blocked in capacitor 65. Switch 66 is open during non-resonant testing operation to disconnect the pulse train from servo controller as will be explained below.

The resultant signal at the output of amplifier 64 includes a DC component which represents the desired mean load on specimen 26 and a series of pulses having areas corresponding to the amount of energy that must be introduced into the resonating system to compensate for friction and damping losses. This combined signal is supplied to coil 68 which controls servo valve 11. The DC component of the signal serves to position the servo valve to allow hydraulic actuator 14 to apply a predetermined constant load in either compression or tension to specimen 26. Each pulse opens the servo valve to an extent determined by the height of the pulse above the average value which is zero and maintains it open throughout the duration of the pulse. For the remainder of the period between pulses the valve is opened in the opposite direction to an extent dependent upon the portion of the pulse below the average value. This results effectively in a loss in internal energy in the actuator and a gain in internal energy to the specimen, enhancing the system Q.

As discussed above, the use of variable area pulses rather than a sinusoidal signal to control the opening of the servo valve enables the system to achieve higher Q or operating efficiency than attained in previous systems where the servo valves were operated by sinusoidal signals.

Figure 3:
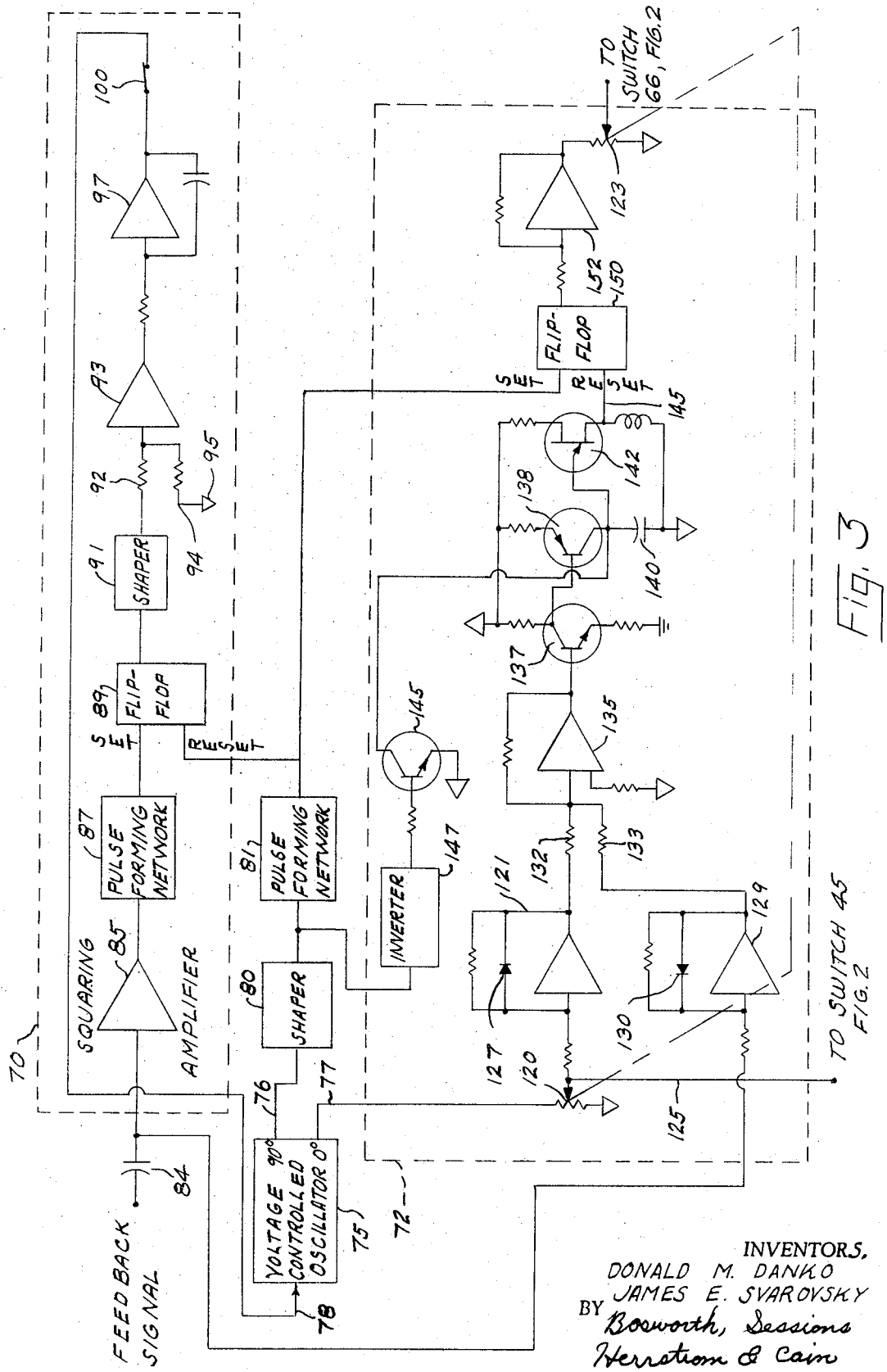
FIG. 3 is a combined block and schematic diagram of the automatic gain and frequency control unit of this invention.

Referring now to FIG. 3, the automatic gain and frequency control unit 34 has two major portions, an automatic frequency control portion indicated in dashed outline at 70 and an automatic gain control portion indicated in dashed outline at 72. Common elements used in both systems are not included within the dashed outlines of either portion.

The common elements include a voltage controlled oscillator 75 having two outputs 76 and 77 and an input 78. Output 77 produces a sinusoidal signal having a frequency that varies with the magnitude of a DC signal applied to input 78. Output 76 produces a pulse train having a repetition rate that varies with the magnitude of the DC signal at input 78. The pulse train from output 76 lags the sinusoidal signal from output 77 by 90°. Voltage controlled oscillator 75 may be, for example, Gilmore Industries Model 429E2 Waveform Generator.

The sinusoidal signal from output 77 is employed in automatic gain control portion 72 to be described below. The pulse train from output 76 is entered into a shaper 80 to standardize the height of the pulses. The output of shaper 80 is employed in the automatic gain control circuit as will be described below and is also entered in a pulse forming network 81 to produce a narrow pulse at the leading edge of each pulse from oscillator 75. The pulse so formed is employed in both the automatic frequency control portion and in the automatic gain control portion to be described below.

Referring now to the automatic frequency control portion 70, the feedback signal from load cell 30 is passed through a capacitor 84 to remove the DC component. The resulting AC signal is passed through a squaring amplifier 85 to produce a square wave signal which is then entered into pulse forming network 87 to produce a sharp pulse at the leading edge of each pulse from the squaring amplifier. Each pulse from pulse forming network 87 sets a flip-flop 89 which is reset by a pulse from pulse forming network 81.

The output of flip-flop 89 consists of a series of pulses having widths equal to the interval between the set and reset pulses applied to its respective set and reset inputs. That series of pulses is entered into a shaper 91 to standardize the height of the pulses. The output of shaper 91 is entered into input 92 of a summing amplifier 93. Another input 94 of summing amplifier 93 is connected to a reference signal 95 equal to the average value of a pulse train from shaper 91 having a 25 percent duty cycle. Summing amplifier 93 compares the output of shaper 91 to reference signal 95 to produce an error signal that is integrated by integrator 97. The output of integrator 97 is fed through switch 100 to input 78 of voltage controlled oscillator 75 to increase or decrease the frequency of the output signals therefrom so that the frequencies equal the resonant frequency of the specimen-mass system. Switch 100 is open for non-resonant testing operation as will be described below.

Figure 4:
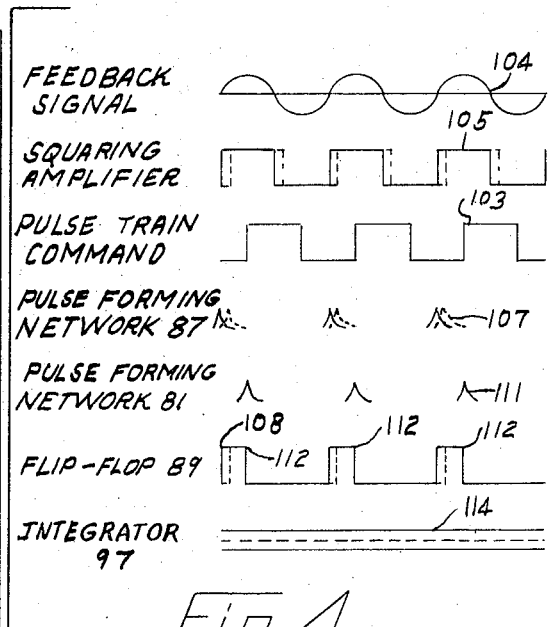
FIG. 4 is a diagram showing the waveforms at various points in the automatic frequency control portion of the circuit of FIG. 3.

The operation of the automatic frequency control system can best be understood by referring to the waveform diagram in FIG. 4. It is known that, when the specimen-mass system is oscillating at its resonant-frequency the force applied to the system lags the resulting force on the system by 90°. In the present illustrative system the feedback signal represents the resulting force and is in phase with the sinusoidal signal from output 77 of voltage controlled oscillator 75.

Referring now to FIG. 4, the pulse train from voltage controlled oscillator 75 is shown at 103 and lags the sinusoidal feedback signal 104 and the pulse train output 105 from squaring amplifier 85 by 90°. The pulses from pulse forming network 87 occur at the leading edge of each pulse in pulse train 105 as shown at 107. These pulses set flip-flop 89 as shown at 108. The pulses from pulse forming network 81 occur at the leading edges of the pulse train command 103 as shown at 111. The pulses 111 reset flip-flop 89 as shown at 112. The output of integrator 97 is shown at 114 as a DC level proportional to the difference between the average value of the output pulse train from shaper 91 and reference signal 95. At resonance the output pulse train from shaper 91 has 25 percent duty cycle and an average value equal to reference signal 95 so that no correction is made in the signal sent to input 78 of voltage controlled oscillator 75 to change the output frequency thereof.

If the resonant frequency of the specimen-mass system should increase as testing proceeds the phase relationship between the various signals will change as shown in the dashed lines in FIG. 4. The interval between pulses 107 and pulses 111 will be shorter and the width of pulses from flip-flop 89 will be less so that the average value of the output from shaper 91 will no longer be the same. Integrator 97 will integrate the error signal from summing amplifier 93 and produce a signal to input 78 of voltage controlled oscillator 75 to cause to correct its output frequency to correspond to the resonant frequency of the specimen-mass system.

Correspondingly, if the resonant frequency of the specimen-mass system becomes less than the frequency of the output system from voltage controlled oscillator 75 the interval between pulses 107 and pulses 111 will increase. Integrator 97 will then produce a signal to command voltage controlled oscillator 75 to decrease its output frequency to correspond to the resonant frequency of the specimen-mass system.

Referring now to the automatic gain control portion 72, the sinusoidal signal from output 78 of voltage controlled oscillator 75 is fed to a potentiometer 120 and a predetermined portion of the signal is entered into a rectifying amplifier 121. The wiper of potentiometer 120 is connected to the wiper of another potentiometer 123 for common movement therewith as indicated by the dashed line therebetween. Potentiometers 120 and 123 are employed to set the amplitude of the variable load applied to the specimen-mass system. The output of potentiometer 120 is connected through line 125 to switch 45 (FIG. 2) for use in non-resonant testing operation. Rectifying amplifier 121 has a diode 127 in its feedback loop polarized so that only the positive half cycle of the input signal is permitted to pass through the amplifier. The negative half cycle is blocked.

The AC component of the sinusoidal feedback signal from load cell 30 is entered into a rectifying amplifier 129 having a diode 130 in its feedback loop polarized oppositely from diode 127 so that amplifier 129 passes only the negative half cycle of the feedback signal. The positive and negative half cycles of the respective signals are summed in resistors 132 and 133 and amplified by amplifier 135. The output signal from amplifier 135 has an average value proportional to the difference between the amplitude of the sinusoidal feedback signal and the amplitude of the sinusoidal command signal. The difference signal controls the conduction of a cascaded pair of transistors 137 and 138.

Transistor 138 is connected in series with a capacitor 140 to supply current thereto at a rate determined by the degree of conduction of the transistor. Capacitor 140 is connected to the emitter of a unijunction transistor 140 which produces an output pulse on line 143 when capacitor 140 has charged to a voltage greater than the emitter to base 2 breakdown voltage of the unijunction transistor.

A transistor 145 is connected across capacitor 140 to provide a current bypass around the capacitor when conductive.

Transistor 145 is rendered conductive through inverter 147 during a half cycle of voltage from voltage controlled oscillator 75 to synchronize the charging cycle of capacitor 140 with the pulse train output from voltage controlled oscillator 75 as will be described below.

The output pulse from unijunction transistor 142 resets a flip-flop 150 which had been set by a pulse from pulse forming network 81. Flip-flop 150 is thus set during the interval between a pulse from pulse forming network 81 and a pulse from unijunction transistor 143. Transistor 145 controls the charging cycle of capacitor 140 so that the capacitor begins its charging cycle at the same time that flip-flop 150 receives a set pulse from pulse forming network 81. The width of the output pulse from flip-flop 150 is thus proportional to the charging time of capacitor 140 which in turn is proportional to the difference between the amplitude of the feedback signal from the load cell and a predetermined portion of the sinusoidal output signal from voltage controlled oscillator 75.

The output signal from flip-flop 150 is amplified in amplifier 152 and is applied to potentiometer 123. A predetermined portion of the signal is picked off by the wiper of potentiometer 123 and sent to switch 66 in the servo controller (FIG. 2) to be combined with the DC signal representing the mean load to be applied to the specimen as described above.

Figure 5:
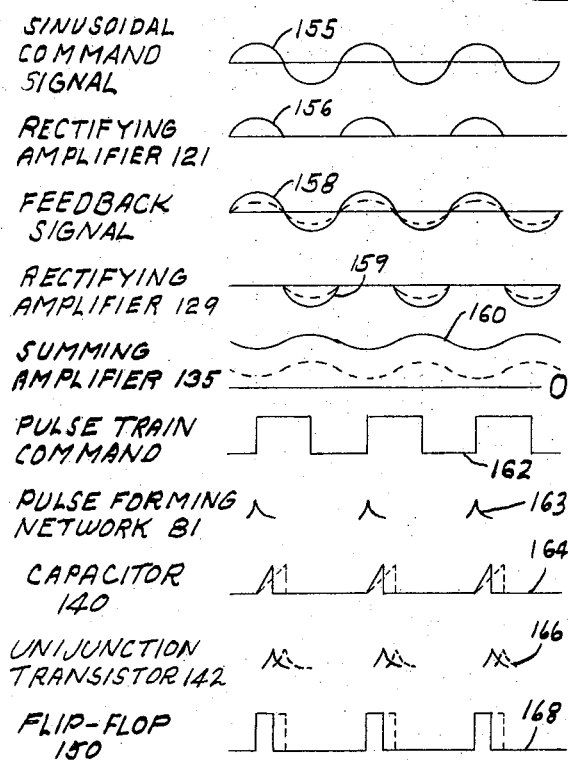
FIG. 5 is a diagram showing the waveforms at various points in the automatic gain control portion of the circuit of FIG. 3.

The operation of the automatic gain control portion 72 can best be understood by referring to the diagrams in FIG. 5. The sinusoidal signal from voltage controlled oscillator 75 is shown at 155 and the positive half cycle thereof that passes through amplifier 121 is shown at 156. Correspondingly, the sinusoidal feedback signal is shown at 158 and the negative half cycle thereof that passes through amplifier 129 is shown at 159. The sum of two separate half cycles after being combined in amplifier 135 is shown at 160. The pulse train from voltage controlled oscillator 75 is shown at 162 and the pulses from pulse forming network 81 are shown at 163.

The charging waveform of capacitor 140 is shown at 164. As shown, the set pulse 163 to flip-flop 150 coincides in time with the beginning of the charging cycle of capacitor 140. The output pulse from unijunction transistor 142 is shown at 166 and, as shown, occurs at the discharge of capacitor 140. The output of flip-flop 150 is shown at 168. The width of the output pulses therefrom is equal to the interval between set pulses 163 and reset pulses 166.

If the feedback signal should decrease in amplitude as shown in dashed lines at 158 and 159 the DC level of the combined signals at the output of summing amplifier 135 become less positive as shown in dashed lines at 160, reducing the flow of current through transistor 138 to charge capacitor 140. Capacitor 138 thereupon charges at a lower rate as indicated by the dashed lines at 164. Reset pulses 166 to flip-flop 150 occur later in time and the width of output pulses from flip-flop 150 increase as shown in dashed lines at 168. As a result the width of pulses supplied to servo valve 11 will be increased, holding the servo valve open longer and allowing more energy to be introduced into the system to compensate for friction and damping losses.

The system is prepared for testing of a specimen by setting potentiometer 44 (FIG. 2) to select a mean load for the specimen. The amplitude of load on the specimen is selected by setting ganged potentiometers 120 and 123 (FIG. 3). Sufficient mass 24 (FIG. 1) is added to the system to bring the resonant frequency of the specimen-mass system as determined by the equation given above to approximately the desired frequency of operation.

In operation, a mean load is applied to the specimen 26 by hydraulic actuator 14 according to the setting of mean load potentiometer 44 (FIG. 2). The specimen-mass system is loaded cyclically about that mean load point with an amplitude determined by the setting of potentiometers 120 and 123 (FIG. 3) and at a frequency corresponding to that of the output signals from voltage controlled oscillator 75.

Load cell 30 senses the mean load and the cyclical variations about the mean load and provides a feedback signal consisting of a DC component proportional to the mean load and an AC component having a frequency corresponding to the repetition rate of the input pulse train. The feedback signal is fed to the automatic gain and frequency control circuit 34 and to the servo controller 31 to perform the functions described above. In the servo controller the DC component of the feedback signal is compared to the mean load set point to produce an error signal to correct the mean load applied to the specimen if necessary. In the automatic frequency control portion of unit 34 the phase of the feedback signal is compared to the phase of the signal from voltage controlled oscillator 75 to determine if the specimen-mass system is operating at its resonant frequency. If not, the output signal from the voltage controlled oscillator 75 is increased or decreased in frequency in the manner described above until the phase relationship indicates that the specimen-mass system is operating at its resonant frequency. Also, as described above, if the resonant frequency of the specimen-mass system changes during the test due to a change in the elastic properties of the specimen as it is stressed, the automatic frequency control system automatically adjusts the input signal to maintain the specimen-mass system operating at its resonant frequency.

The automatic gain control portion of the system (FIG. 3) varies the width of the pulses that operate servo valve 11 to supply more or less energy to the system to maintain the system in resonance at a desired load in the manner described above.

It should be noted that the control system may also be adapted for control of standard, non-resonant testing by opening switches 48 and 66 (FIG. 2) and 100 (FIG. 3). Opening switch 100 disconnects the pulse train from servo controller 31 and makes the automatic gain and frequency control unit 34 effectively a constant frequency sinusoidal signal generator. Opening switch 48 conditions the servo controller to respond to the AC component of the feedback signal. Closing switch 45 (FIG. 2) connects the sinusoidal command signal from potentiometer 120 to the input of the servo controller. With these switches so changed the servo controller controls servo valve 11 for non-resonant testing in the conventional manner. In non-resonant testing it is not necessary to employ the mass 24 (FIG. 1) but it may be retained in the system or not according to the desires of the tester.

It should also be noted that any non-resonant testing system may easily be adapted for resonant testing merely by addition of appropriate mass 24 and the use of our servo controller 31 and automatic gain and frequency control unit 34.

While we have specifically illustrated and described a preferred form and embodiment of our invention, changes and improvements will occur to those skilled in the art who come to understand its essential principles and accomplishments. We do not, therefore wish to be confined to the specific forms of our invention herein specifically disclosed nor in any other way inconsistent with the progress by which our invention has promoted the art.

In particular, those skilled in the art will recognize that various changes may be made in the embodiment specifically shown and described herein without departing from the scope of our invention. For example, a sensor other than a load cell, such as a strain gage or an extensometer may be employed to provide the feedback signal to servo controller 31 and automatic gain and frequency control unit 24. Minor changes in the automatic gain and frequency control circuit will compensate for the differences, such as in phase, of the feedback signals that could be obtained from the specimen-mass system without departing from the spirit and scope of the invention.

What is claimed is:

1. In a machine for testing an elastic specimen by cyclically applying loads thereto, said machine having a mass associated with said specimen of such magnitude that the specimen-mass system has a resonant frequency within a desired range, a hydraulic actuator connected to said specimen and mass and a hydraulic servo valve controlling flow of hydraulic fluid under pressure to and from said actuator, the method of controlling said servo valve comprising the step of supplying periodic rectangular control pulses to open said valve to an extent determined by the height of said pulses and for a time determined by the width of said pulses, the repetition rate of said pulses corresponding to the resonant frequency of the specimen-mass system.

2. The method as claimed in claim 1 further comprising the step of positioning said servo valve to apply a mean load on said specimen.

3. The method as claimed in claim 1 further comprising the step of varying the repetition rate of said pulses to maintain the specimen-mass system at its resonant frequency as the elastic properties of said specimen change during test.

4. The method as claimed in claim 1 further comprising the step of varying the area of said pulses to control the amount of energy supplied to the specimen-mass system.

5. In a machine for testing an elastic specimen by cyclically applying loads thereto, said machine having a mass associated with said specimen of such magnitude that the specimen-mass system has a resonant frequency within a desired range, a hydraulic actuator connected to said specimen and mass, and a hydraulic servo valve controlling the flow of hydraulic fluid under pressure to and from said actuator, the method of controlling said servo valve comprising the steps of supplying periodic rectangular control pulses to open said valve to an extent determined by the height of said pulses and for a time determined by the width of said pulses, controlling the repetition rate of said pulses to maintain said specimen-mass system at its resonant frequency, and controlling the area of said pulses to control the amount of energy supplied to said specimen-mass system.

6. The method as claimed in claim 5 further comprising the step of positioning said valve to apply a mean load on said specimen-mass system.

7. In a machine for testing an elastic specimen by cyclically applying loads thereto, said machine having a mass associated with said specimen of such magnitude that the specimen-mass system has a resonant frequency within a desired range, a hydraulic actuator connected to said specimen and mass, and a hydraulic servo valve controlling the flow of hydraulic fluid under pressure to and from said actuator, the method of controlling said servo valve comprising the steps of supplying periodic rectangular pulses to open said valve to an extent determined by the height of said pulses and for a time determined by the width of said pulses, producing a feedback signal indicative of the load on said specimen, utilizing said feedback signal to produce a signal indicative of the difference between the resonant frequency of the specimen-mass system and the frequency of said feedback signal, varying the repetition rate of the pulses in response to said frequency difference signal to cause said specimen-mass system to operate at its resonant frequency, utilizing said feedback signal to produce a signal indicative of the difference between the load on said specimen-mass system and a predetermined desired load thereon and varying the area of said pulses in response to said load difference signal to cause said specimen-mass system to be loaded the predetermined amount.

8. The method as claimed in claim 7 further comprising the steps of supplying a signal to position said servo valve to apply a predetermined mean load on said specimen-mass system, utilizing said feedback signal to produce a signal indicative of the difference between a mean load on said specimen-mass system and the desired mean load, and varying said position signal in response to said mean load difference signal to cause said mean load on said specimen-mass system to equal the desired amount.

9. In a machine for testing an elastic specimen by cyclically applying loads thereto, said machine having a mass associated with said specimen of such magnitude that the specimen-mass system has a resonant frequency within a desired range, a hydraulic actuator connected to said specimen and mass and a hydraulic servo valve controlling the flow of hydraulic fluid under pressure to and from said actuator, apparatus for controlling the operation of said machine comprising means for supplying periodic rectangular pulses to open said servo valve to an extent determined by the height of said pulses and for a time determined by the width of said pulses, said servo valve having a frequency response sufficient to enable it to respond to said pulses, the repetition rate of said pulses corresponding to the resonant frequency of the specimen-mass system.

10. The apparatus as claimed in claim 9 further comprising means for providing a signal to position said valve to apply a predetermined mean load on said specimen-mass system.

11. The apparatus as claimed in claim 9 further comprising means for varying the repetition rate of said pulses to maintain said specimen-mass system at its resonant frequency as the elastic properties of said specimen change during test.

12. The apparatus as claimed in claim 9 further comprising means for varying the area of said pulses to control the amount of energy supplied to said specimen-mass system.

13. In a machine for testing an elastic specimen by cyclically applying loads thereto, said machine having a mass associated to said specimen of such magnitude that the specimen-mass system has a resonant frequency within a desired range, a hydraulic actuator connected to said specimen and mass and a hydraulic servo valve controlling flow of hydraulic fluid under pressure to and from said actuator, apparatus for controlling the operation of said machine comprising means for supplying periodic rectangular control pulses to open said valve to an extent determined by the height of said pulses and for a time determined by the width of said pulses, said servo valve having a frequency response sufficient to enable it to respond to said pulses, means for controlling the repetition rate of said pulses to cause said rate to correspond to the resonant frequency of said specimen-mass system, and means for controlling the area of said pulses to control the amount of energy supplied to said specimen-mass system.

14. The apparatus as claimed in claim 13 further comprising means for supplying a signal to position said valve to apply a predetermined mean load on said specimen-mass system.

15. Apparatus for controlling the operation of a machine for testing an elastic specimen, said machine including a hydraulic actuator coupled to said specimen for applying force thereto, a mass associated with said specimen of such magnitude that the specimen-mass system has a resonant frequency within a desired range, and a hydraulic servo valve coupled to said actuator for controlling the flow of hydraulic fluid under pressure to and from said actuator, said apparatus comprising means for supplying periodic rectangular control pulses to open said valve to an extent determined by the height of said pulses and for a time determined by the width of said pulses, said servo valve having a frequency response sufficient to enable it to respond to said pulses, means for producing a feedback signal corresponding to the load on said specimen-mass system, means for comparing said feedback signal to said periodic pulses to produce a signal indicative of the difference between the resonant frequency of said specimen-mass system and the frequency of said feedback signal, means for varying the repetition rate of said pulses in response to said frequency difference signal to cause said rate to correspond to the resonant frequency of said specimen-mass system, a reference signal corresponding to the desired load on said specimen-mass system, means for comparing said feedback signal to said reference signal to produce a signal indicative of the difference between the load on said specimen-mass system and the desired load and means for varying the area of said pulses in response to said load difference signal to maintain the desired load on said specimen-mass system.

16. Apparatus as claimed in claim 15 further comprising means for supplying a signal to position said servo valve to apply a predetermined mean load on said specimen-mass system, means for comparing said feedback signal to said position signal to produce a signal indicative of the difference between the mean load on said specimen-mass system and the desired mean load, and means for varying said position signal in response to said mean load difference signal to maintain a constant predetermined mean load on said specimen-mass system.

17. Apparatus for controlling the operation of a machine for testing an elastic specimen, said machine including a hydraulic actuator coupled to said specimen for applying force thereto, a mass associated with said specimen of such magnitude that the specimen-mass system has a resonant frequency within a desired range, and a hydraulic servo valve coupled to said actuator for controlling the flow of hydraulic fluid under pressure to and from said actuator, said apparatus comprising means for supplying periodic control pulses to open said valve to an extent determined by the height of said pulses and for a time determined by the width of said pulses, said servo valve having a frequency response sufficient to enable it to response to said pulses, means for producing a feedback signal corresponding to the load on said specimen-mass system, means for comparing said feedback signal to said periodic pulses to produce a signal indicative of the difference between the resonant frequency of said specimen-mass system and the frequency of said feedback signal, means for varying the repetition rate of said pulses in response to said frequency difference signal to cause said rate to correspond to the resonant frequency of said specimen-mass system, a reference signal corresponding to the desired load on said specimen-mass system, means for comparing said feedback signal to said reference signal to produce a signal indicative of the difference between the load on said specimen-mass system and the desired load, means for varying the area of said pulses in response to said load difference signal to maintain the desired load on said specimen-mass system, means for supplying a signal to position said servo valve to apply a predetermined mean load on said specimen-mass system, means for comparing said feedback signal to said position signal to produce a signal indicative of the difference between the mean load on said specimen-mass system and the desired mean load, the D.C. component of said feedback signal corresponding to the mean load on said specimen-mass system, said comparing means including a summing amplifier for comparing said feedback signal to said position signal, and a bypass circuit around said summing amplifier responsive only to the A.C. component of said feedback signal, the A.C. component of said feedback signal passing through said amplifier being nulled against the A.C. component of said feedback signal passing around said amplifier, and means for varying said position signal in response to said mean load difference signal to maintain a constant predetermined mean load on said specimen-mass system.

18. In a machine for testing an elastic specimen by cyclically applying loads thereto, said machine having a mass associated with said specimen of such magnitude that the specimen mass system has a resonant frequency within a desired range, an automatic frequency control system for exciting and controlling said specimen-mass system at its resonant frequency comprising variable frequency means for supplying a signal to excite said specimen-mass system, means for producing a feedback signal corresponding to the load on said specimen-mass system, means for comparing the phase of said feedback signal to the phase of said excitation signal to produce a signal proportional to the phase difference from a predetermined phase relationship, and means responsive to said phase difference signal for varying the frequency of said variable frequency means to cause it to equal the resonant frequency of said specimen-mass system.

19. The frequency control system as claimed in claim 18 wherein said excitation signal comprises a series of pulses.

20. In a machine for testing an elastic specimen by cyclically applying loads thereto, said machine having a mass associated with said specimen of such magnitude that the specimen-mass system has a resonant frequency within a desired range, an automatic frequency control system for exciting and controlling said specimen-mass system at its resonant frequency comprising a voltage controlled oscillator for supplying a signal to excite said specimen-mass system, said oscillator producing an output signal having a frequency proportional to a DC signal applied to its input, means for producing a feedback signal corresponding to the load on said specimen, means for producing a first pulse at a point in each cycle of the output signal from said voltage controlled oscillator, means for producing a second pulse at a corresponding point in each cycle of said feedback signal, bistable means assuming a first stable state in response to said first pulse and a second stable state in response to said second pulse, means responsive to a stable state of said bistable means for producing a DC signal proportional to the interval between said pulses, and means for applying said DC signal to said voltage controlled oscillator to control its output frequency, whereby the output signal from said voltage controlled oscillator is maintained at the resonant frequency of said specimen-mass system.

21. In a machine for testing an elastic specimen by cyclically applying loads thereto, said machine having a mass associated with said specimen of such magnitude that the specimen-mass system has a resonant frequency within a desired range, an automatic gain control system for controlling the amount of energy supplied to said specimen-mass system comprising means for producing a feedback signal corresponding to the load on said specimen-mass system, means for producing a reference signal corresponding to the desired load on said specimen, means for comparing said feedback signal to said reference signal to produce a signal indicating the difference therebetween, means for producing a series of pulses, means for varying the area of said pulses in response to said difference signal, and means for supplying said variable area pulses to excite said specimen-mass system.

22. In a resonant testing machine for testing in elastic specimen by cyclically applying loads thereto, said machine having a mass associated with said specimen of such magnitude that the specimen-mass system has a resonant frequency within a desired range, an automatic gain control system for controlling the amount of energy supplied to said specimen-mass system comprising means for producing a reference signal having an amplitude corresponding to the desired load on said specimen mass system, means for producing a feedback signal corresponding to the load on said specimen-mass system, means for comparing the amplitude of said reference signal to the amplitude of said feedback signal to produce an error signal, means for producing a first pulse at a point in each cycle of the reference signal, means for producing a second pulse at an interval from said first pulse determined by the magnitude of said error signal, bistable means response to said first pulse for assuming a first stable state and responsive to said second pulse for assuming a second stable state, whereby said bistable means produces pulses at the frequency of said reference signal and wider as said error signal is larger and narrower as said error signal is smaller, and means for supplying said variable area pulses to excite said specimen-mass system.

23. In a machine for testing an elastic specimen by cyclically applying loads thereto, said machine having a mass associated with said specimen of such magnitude that the specimen-mass system has a resonant frequency within a desired range, a hydraulic actuator coupled to said specimen for applying force thereto, and a hydraulic servo valve coupled to said actuator for controlling the flow of hydraulic fluid under pressure to and from said actuator, apparatus for maintaining a predetermined mean load on said specimen-mass system comprising means for positioning said servo valve to apply a mean load on said specimen-mass system, a reference signal proportional to the desired mean load on said specimen-mass system, means for producing a feedback signal having a DC component indicative of the mean load on said system, means for comparing said DC component to said reference signal to produce an error signal, said comparing means comprising a summing amplifier for comparing said feedback signal to said reference signal, and a bypass circuit around said summing amplifier responsive only to the AC component of said feedback signal, the AC component of said feedback signal passing through said amplifier being nulled against the AC component of said feedback signal passing around said amplifier, and means responsive to the output of said summing amplifier for correcting the position of said servo valve.

24. The method as claimed in claim 4 wherein the area of said pulses is varied by varying their width.

25. The method as claimed in claim 5 wherein the area of said pulses is controlled by controlling their width.

26. The method as claimed in claim 7 wherein the area of said pulses is varied by varying their width.

27. The apparatus as claimed in claim 12 wherein said means for varying the area of said pulses varies their width.

28. The apparatus as claimed in claim 13 wherein said means for controlling the area of said pulses controls their width.

29. Apparatus as claimed in claim 15 wherein said means for varying the area of said pulses varies their width.

* * * * *